Jan. 18, 1927.　　　　　　　　　　　　　　　　　　　　1,614,512

J. WILLISON

CAR COUPLER

Original Filed Feb. 4, 1921　　6 Sheets-Sheet 1

Jan. 18, 1927.

J. WILLISON 1,614,512

CAR COUPLER

Original Filed Feb. 4, 1921    6 Sheets-Sheet 2

Inventor
John Willison
By his Attorney
Clarence D Kerr

Jan. 18, 1927.

J. WILLISON 1,614,512

CAR COUPLER

Original Filed Feb. 4, 1921  6 Sheets-Sheet 3

Inventor
John Willison
By his Attorney
Clarence D. Kerr

Jan. 18, 1927.  
J. WILLISON  
CAR COUPLER  
Original Filed Feb. 4, 1921    6 Sheets-Sheet 4  
1,614,512

Inventor
John Willison
By his Attorney
Clarence D Kerr

Jan. 18, 1927.
J. WILLISON
1,614,512
CAR COUPLER
Original Filed Feb. 4, 1921    6 Sheets-Sheet 5
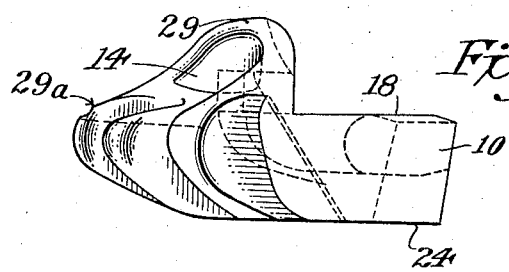
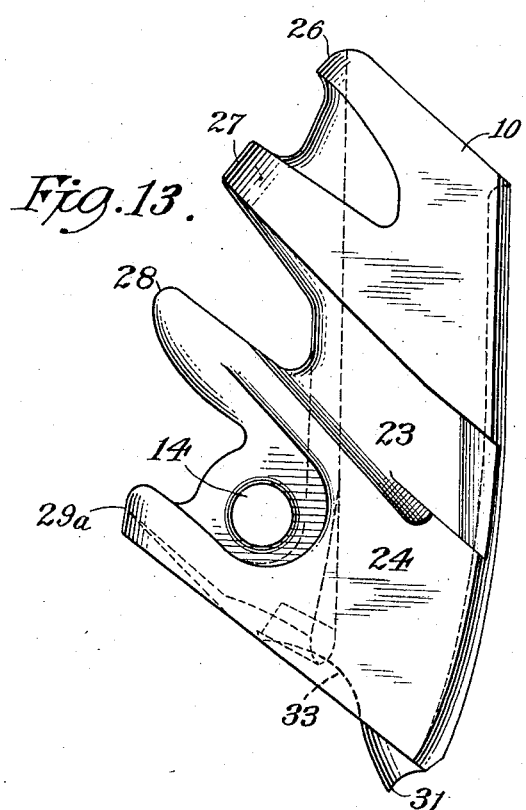
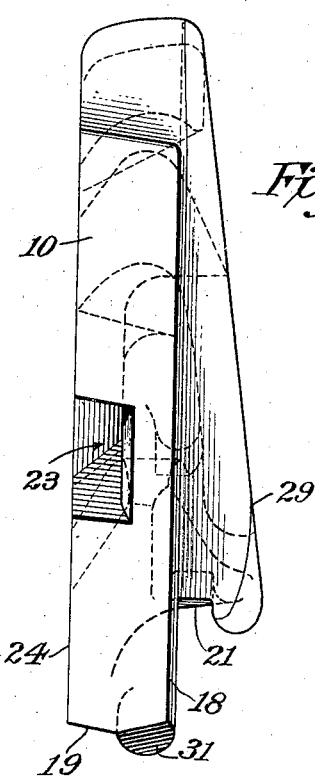
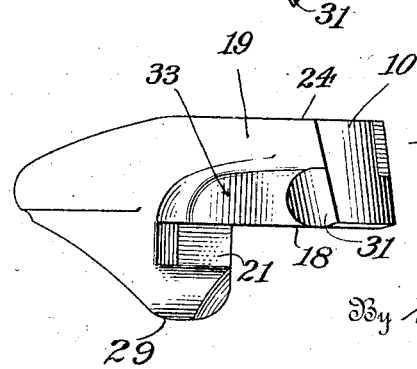
Inventor
John Willison
By his Attorney
Clarence D. Kerr

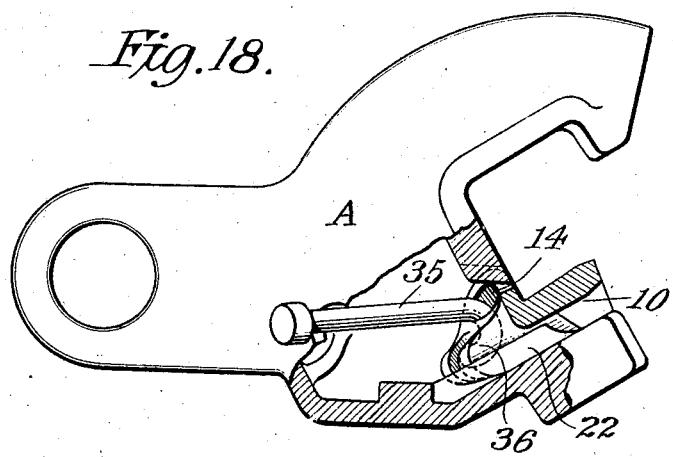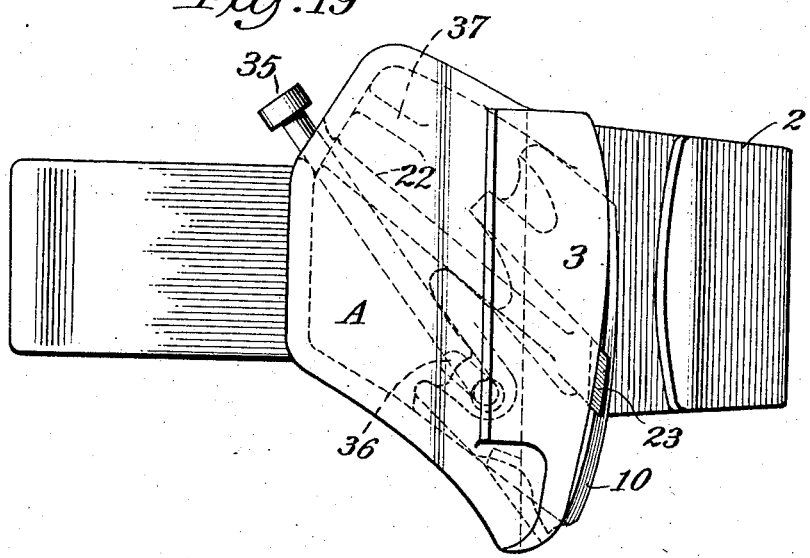

Patented Jan. 18, 1927.

1,614,512

UNITED STATES PATENT OFFICE.

JOHN WILLISON, OF CLEVELAND, OHIO, ASSIGNOR, BY MESNE ASSIGNMENTS, TO NATIONAL MALLEABLE AND STEEL CASTINGS COMPANY, OF CLEVELAND, OHIO, A CORPORATION OF OHIO.

CAR COUPLER.

Application filed February 4, 1921, Serial No. 442,359. Renewed May 26, 1926.

Figure 1:
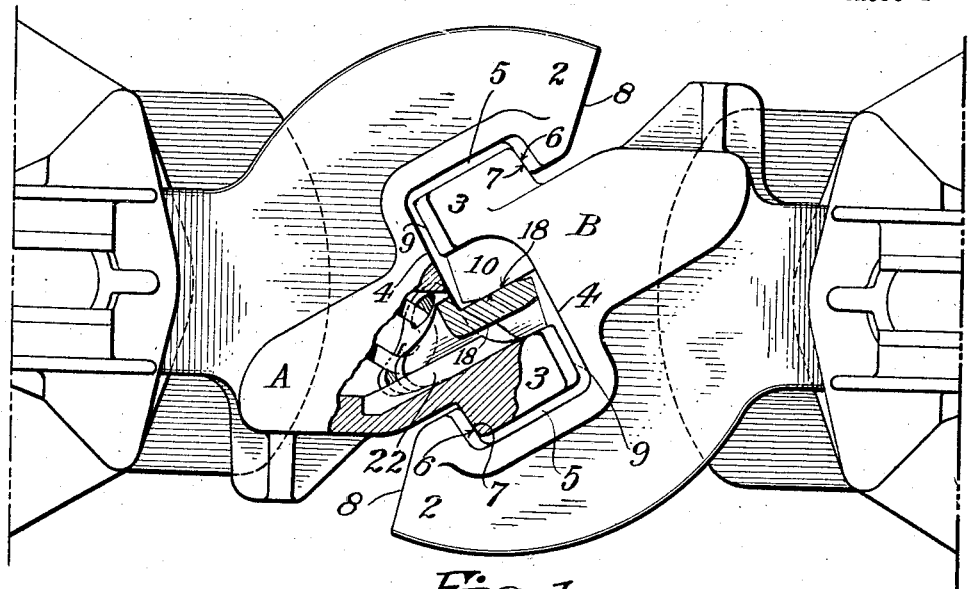
Figure 2:
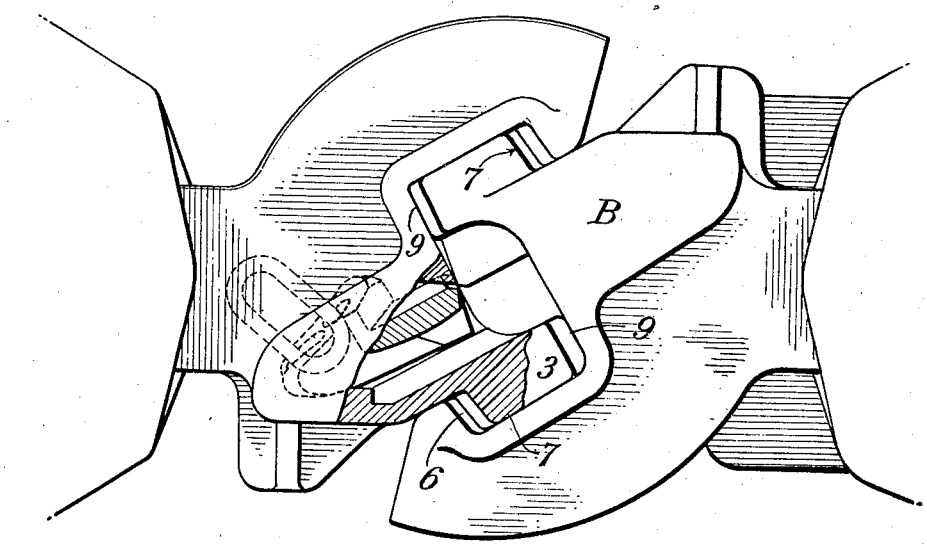
Figure 3:
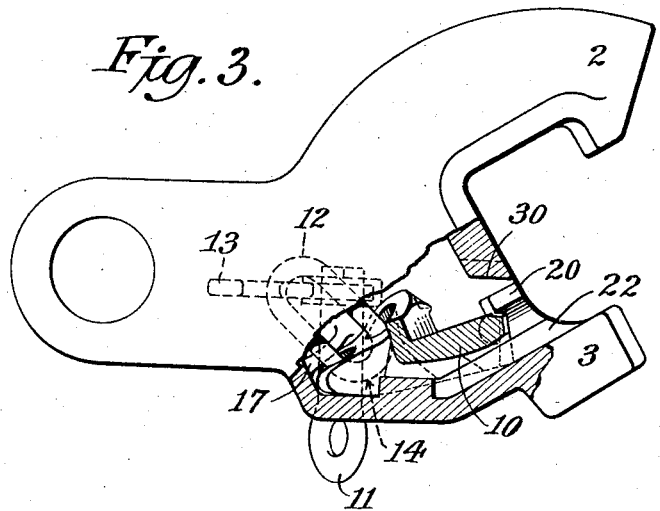
Figure 4:
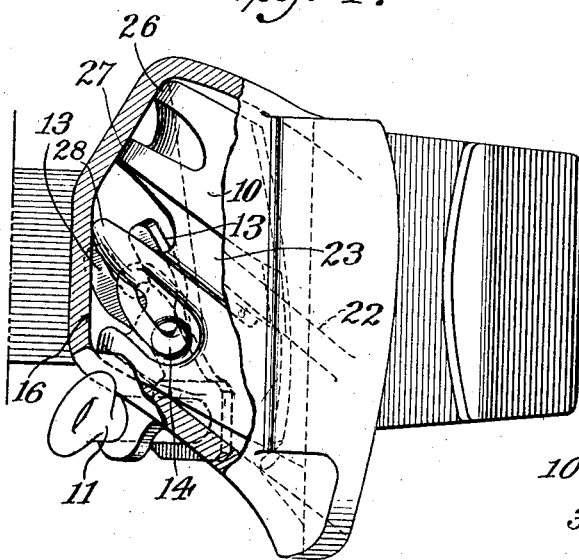
Figure 5:
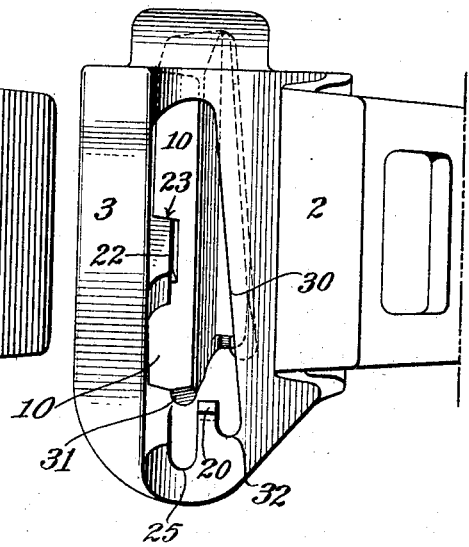
Figure 6:
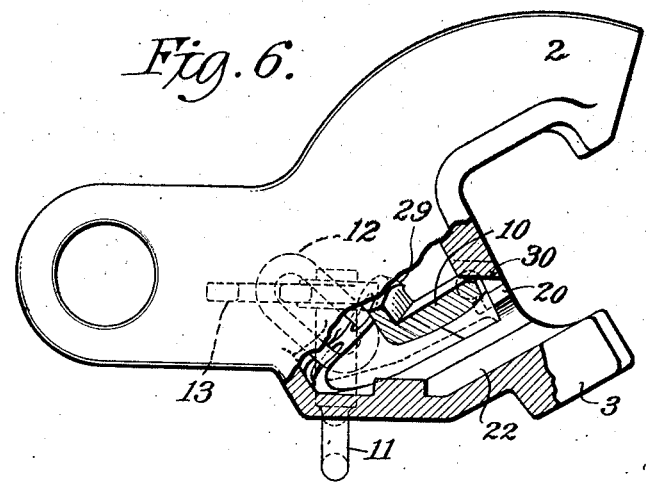
Figure 16:
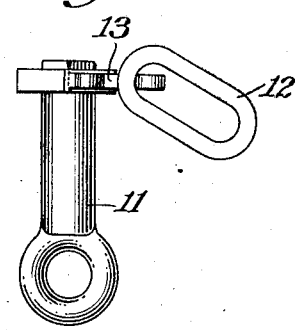
Figure 7:
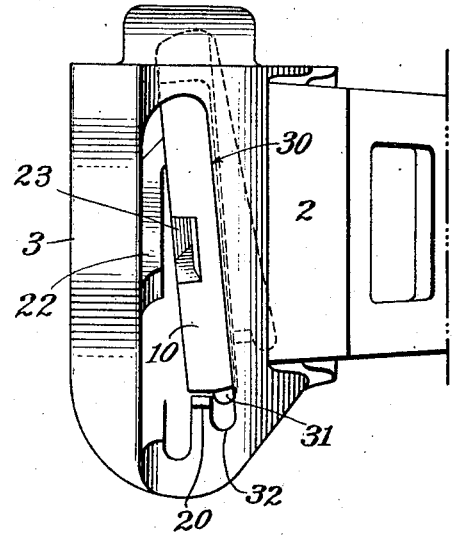
Figure 17:
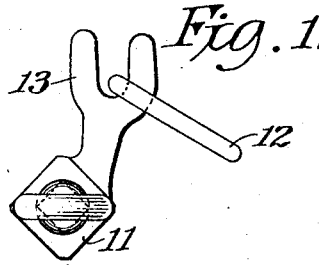
Figure 11:
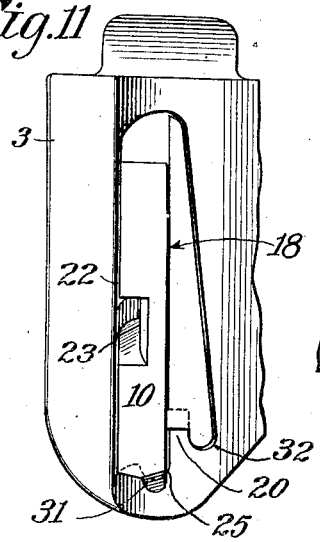
Figure 8:
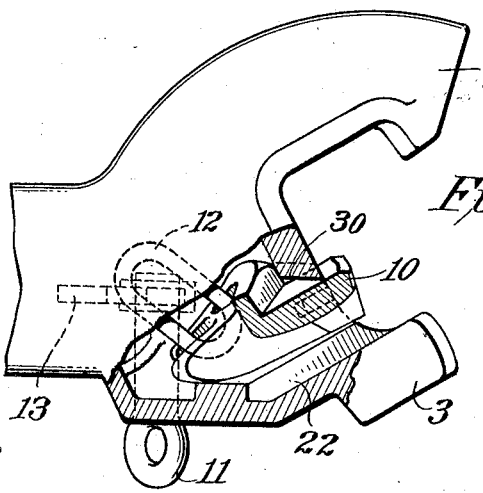
Figure 9:
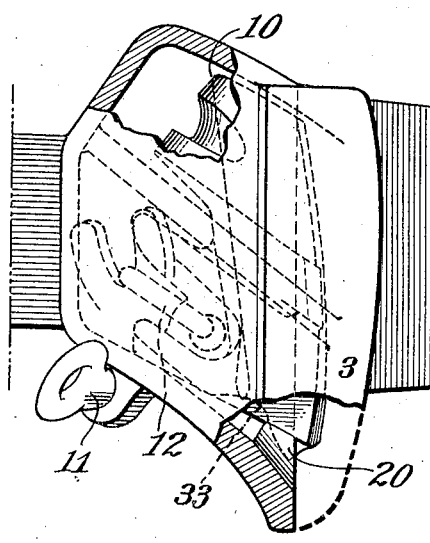
Figure 10:
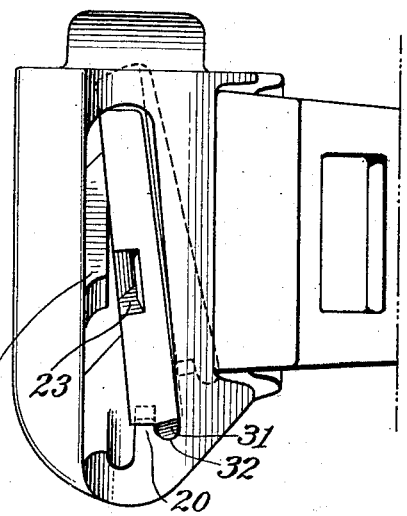

Fig. 1 is a plan showing a pair of couplers embodying my invention, coupled together in locked position and with one of the couplers partly broken away; Fig. 2 is a plan similar to Fig. 1, but with one of the locks in lock-set position; Figs. 3, 4 and 5 respectively show a plan (partly broken away), a side elevation, and a front elevation of the coupler with the lock in raised and unlocked position; Figs. 6 and 7 show in plan and front elevation, respectively, the lock in process of moving from elevated to lock-set position; Figs. 8, 9 and 10 show in plan, side elevation and front elevation the lock in lock-set position; Fig. 11 shows the front elevation the lock in lowermost or locked position; Figs. 12, 13, 14 and 15 show, respectively, top plan, side elevation, front elevation and bottom plan views of the lock; Figs. 16 and 17 show in plan and elevation, respectively, the operating mechanism and the link by which it is connected to the lock; and Figs. 18 and 19 show a plan and a side elevation, respectively, of a modified form of my coupler adapted for top operation.

My invention relates to couplers of the vertical plane, rigid jawed type, such as are shown in my Letters Patent No. 1,201,665, dated October 17, 1916, in which the coupler consists in a coupler head, a lock, and in a suitable actuating mechanism for the lock. The present invention comprises improvements in the aforesaid coupler, particularly in the form of the lock, the corresponding and cooperating parts of the coupler head and in the unlocking and lock-setting means. My invention also consists in the various features which I shall hereinafter describe and claim.

Referring to the drawings, each of the opposing identically-formed coupler heads A and B, as is shown in Fig. 1, has rigid jaws 2 and 3, connected by a buffing face 4, arranged on axes inclined laterally to the line of draft. Each jaw 2 has a lateral recess 5 to receive the complementary jaw 3 of an opposing coupler, and its pulling face 6 engages a complementary face 7 on the jaw 3. In coupling, the laterally inclined faces 8 and 9 on one coupler cooperate with the faces 9, 8 and 4 of the other coupler to swing the couplers laterally to interlock their jaws 2 and 3. With the couplers in the coupled position of Fig. 1, the faces 6 on the jaws 2 and the faces 7 on the jaws 3 engage in pulling, and the faces 4 between the jaws engage the faces 9 on the jaws 3 in buffing.

The operating parts of the coupler consist in the lock 10, arranged with its axis inclined laterally to the line of draft, the operating spindle 11, and the link 12, which connects the lever and lock. The spindle 11 is journalled in the bottom of the coupler shank at the rear of the coupler head and has secured to its squared inner end a forked lever arm 13 which projects up through a slot in the floor of the coupler. The link 12 connects the lever arm 13 and the lock 10 through its eye 14, as is shown in Fig. 4. The lever arm 13, as is shown in Fig. 3, is preferably displaced laterally and angularly from the lock.

The lock pocket, as is shown in Fig. 4, inclines upwardly and rearwardly from its mouth, and its rear end terminates in a substantially vertical wall 16 and in a curved or laterally inclined rib 17 at the bottom of such wall.

In Fig. 1 the couplers are shown in the normal locked or mated position. The lock in locked position extends beyond the buffing face of the coupler A and bears with its side face 18 against a corresponding face 18 of the lock 10 of the coupler B. In this position the under side 19 of the lock rests on the inclined floor of the coupler between the projection 20 and the jaw 3. The lock is prevented from sliding out of the lock pocket by the projection 20, which strikes the end of the slot 21 on the bottom of the lock. The upwardly inclined rib 22 on the inside of the jaw 3 engages the correspondingly inclined recess 23 in the side 24 of the lock, as is shown in Fig. 11.

To uncouple, the spindle 11 is rotated to the left. This causes the lever arm 13 to move rearwardly, drawing with it, through the link 12, the lock 10. As the lock is actuated through the spindle 11, lever arm 13 and link 12, the lock 10 is guided upwardly and rearwardly by the inclined floor of the pocket, by the tongue 31 operating in the groove 25 in the floor of the pocket, and by the engagement of the rib 22 with the recess 23, until the projections 26, 27 and 28 on the rear side of the lock engage the rear wall 16 of the lock pocket, and the part 29ª of the lock bears against the inclined or curved rib 17, which extends forward from the rear wall 16 of the pocket, as is shown in Figs. 3, 4 and 5. If the spindle is released the lock (the position of the opposing coupler permitting) will slide back by gravity into the position of Fig. 1.

To bring the lock into lock-set position after it has reached the unlocked position of Figs. 3, 4 and 5, the spindle 11 is further rotated and the offcentered application of force applied through the link 12 swings the lock about the projections 26, 27 and 28 on the lock as a pivot, while the part 29ª of the lock bears against the rib 17 as a fulcrum. As a result, the front of the lock swings toward the jaw 2 about a vertical axis, and as its side face 18 strikes the inclined and undercut wall 30 on the side of the pocket toward the jaw 2 the lock is tilted from the vertical into the inclined position shown in Fig. 7. This tilting action causes the tongue 31 on the under side of the lock to pass to the rear of the projection 20 on the floor of the pocket, ready to enter the lock-set groove 32 between the projection 20 and inclined wall 30, as is shown in Figs. 6 and 7.

Upon releasing the spindle 11 the lock 10, actuated by gravity, slides downwardly and forwardly, with the tongue 31 in the groove 32, into lock-set position, as is shown in Figs. 8, 9 and 10. In this position the front face of the lock 10 bears against the corresponding face of the lock of the opposing coupler, as is shown in Fig. 2. The engagement of the projection 31 on the under side of the lock with the lock set groove 32 insures the lock engaging the face of the opposite lock and keeps it from being jarred out of engagement with that lock.

When the couplers are pulled apart the lock slides forward until the lateral extension 29 on the lock strikes the inner edge of the inclined wall 30 of the lock pocket, the tongue 31 on the outer under face of the lock passing out of the lock-set groove 32, and the under surface 19 of the lock rides upon the top of the projection 20 in the pocket floor. As the lock slides forwardly the lateral extension 29, by its engagement with the inclined wall 30, forces the rear end of the lock over toward the inner face of the jaw 3, and this, as the forward end of the lock is free, permits the recessed portion 33 of the lock to slide over the projection 20, thus clearing the forward portion of the lock, which tends by gravity to swing into alignment with its rear end, and brings the bottom surface 19 of the lock into engagement with the normal inclined surface of the lock pocket. Abnormal tilting action of the lock is prevented by the engagement of the rib 22 with the recess 23 of the lock, as is shown in Fig. 11. As the lock slides forward the projection 20, after clearing from the recess 33, enters the slot 21 in the bottom of the lock and by contact with the rear wall of the slot 21 prevents excessive outward movement of the lock.

When the couplers are in coupled position their tendency is to pull apart by moving laterally to each other. This lateral movement, which is resisted by the lock, is parallel to the plane of the pulling faces and at right angles to the locking face of the lock, so that the pulling stresses imposed on the lock are at right angles to it.

In Figs. 18 and 19 I have shown a modification of my invention, in which the coupler is operated through the top by a rod 35, which terminates in a hook 36, which is inserted into the eye 14 of the lock 10. The upper end of the rod 35 projects through the top of the coupler shank at the rear of the coupler head.

When the lock is pulled upwardly and rearwardly into raised position by the rod 35, a rib 37 (not shown in the preferred form) enters the recess between the projections 26 and 27 and acts as an additional guide. A further pull on the rod causes the lock to rotate about the pivots 26, 27, 28. Otherwise the action of the lock with the operating mechanism is essentially the same as the mechanism shown in Figs. 1 to 17.

Couplers embodying my invention are extremely durable and are of compact and simple form, a minimum of parts is employed, the stresses of buffing and draft are taken up directly by the coupler heads, and the operation of the locks is reliable and positive. It is also of advantage to lock-set the lock in the manner shown without the use of any additional parts.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. A coupler head, movable laterally, having oppositely extending jaws integral therewith, adapted to engage with correspondingly shaped jaws on an opposing coupler head, a longitudinally extending cavity in the coupler head, a gravity actuated lock in said cavity slidable on an incline therein, the lock adapted to extend forwardly from the cavity to engage a corresponding face on a similarly arranged lock on the opposing coupler head, the axes of the coupler heads and the locks being arranged at an angle to the line of draft.

2. A coupler head having oppositely extending jaws integral therewith, an inclined cavity in the head, a lock movable in said cavity, an operating lever movable in a plane at an angle to the long axis of the lock adapted to move the lock longitudinally of the cavity and swing it laterally thereof.

3. A coupler head having a cavity therein, a lock movable longitudinally of said cavity, said lock having at is forward end a tongue cooperating with one groove during normal locking and unlocking movements and with another groove during lock-setting, said grooves being arranged in the floor of the coupler.

4. A coupler head having a cavity therein, a lock movable longitudinally of said cavity, a projection on the floor of the coupler head cooperating with recesses on the under side of the lock during the longitudinal movement thereof.

5. A coupler head having a cavity therein, a lock movable longitudinally in said cavity, the lock having a fulcrum bearing at the rear of the coupler cavity, and means for tilting the lock about said fulcrum bearing to swing its forward end laterally toward lock-set position.

6. A coupler head having a cavity therein, a lock movable longitudinally of the coupler head, the cavity having at its rear end a bearing for the lock and at its forward opening an inclined wall at one side thereof, the said bearing serving on the application of an offcentered pull as a pivot for the lock and the inclined wall to tilt the lock into position to slide by gravity into lock-set position.

7. A lock for a car coupler having a groove for a guiding means, a pivot bearing to permit rotation of the lock on a vertical axis, means to prevent egress from the coupler cavity and an aperture for securing an operating connection.

8. A car coupler having a cavity therein open from the forward side, a lock operable in said cavity, and extending forwardly therefrom in lock-setting, and being held in lock set position by engagement with an opposing coupler when in coupling position.

9. A car coupler having a cavity therein open from the forward side, a lock reciprocable in said cavity and projecting forwardly therefrom during lock-setting, and when in coupling position with an opposing coupler being held in lock-set position by a corresponding lock projecting from said opposing coupler head.

10. A car coupler having a cavity therein open from the forward side, a lock movable longitudinally in said cavity, operating means for the lock secured to a rear portion of the lock, the force of said operating means being applied to said lock at a lateral angle to the axis thereof.

11. A car coupler having two rigid, oppositely extending jaws adapted to interlock with correspondingly shaped jaws on an opposing coupler head, a lock seating in a cavity in each of said couplers and projecting forwardly to overlap the lock in the opposing coupler, when in locked position, the long axes of the locks being inclined laterally to the line of draft.

12. A coupler having a lock in which the top and bottom surfaces are substantially parallel and are arranged at an angle to the horizontal axis of the lock, a lock pocket open from the forward face of the coupler having top and bottom surfaces corresponding to the top and bottom surfaces of the lock, a groove in the lock for a guiding means, an operating connection extending through the coupler head and engaging a rearwardly extending portion of the lock, the forward portion of said lock when in coupling position being capable of projection beyond the forward face of the coupler head between the coupler jaws.

13. A car coupler having rigid jaws on opposite sides of its longitudinal center line adapted to interlock with corresponding jaws on an opposing coupler head, a lock seating in a cavity in said coupler head and projecting forwardly to overlap the lock in an opposing coupler when in locked position, the projecting portion of said lock having its longitudinally extending axis inclined laterally to the line of draft.

14. A car coupler having two rigid, oppositely extending jaws, pulling faces upon said jaws inclined laterally to the line of draft, a lock movable in a cavity in said coupler to assume a projected locking position and a retracted unlocking position, the projecting portion of said lock being substantially perpendicular to the planes of said pulling faces.

JOHN WILLISON.